3,203,783
PROCESS OF INCORPORATION OF CORRECTIVES IN THE MANUFACTURE OF IRON BY THE METHOD OF FUSION WITH A CONSUMABLE ELECTRODE

Lucien Peras, Billancourt, France, assignor to Regie Nationale des Usines Renault, Billancourt, France
No Drawing. Filed Apr. 7, 1961, Ser. No. 101,357
Claims priority, application France, Apr. 14, 1960, 824,414
2 Claims. (Cl. 75—11)

In previous patent applications in the name of the same applicant, there has been described a new method of manufacture of iron and steel which consists essentially in reducing iron ore to obtain ferrous oxide (FeO) which is then crushed and reduced in powdered form in a fluidized bed by hydrogen, thus obtaining iron reduced in powder form.

In addition, there has been perfected a method of fusion in a steel bath with a consumable electrode, this method being applicable to reduced iron previously given the form of an electrode. This method forms the subject of patent application Serial No. 68,751, filed Nov. 14, 1960, now abandoned, for "A Method of Fusion With a Consumable Electrode Under Slag and With Continuous Pouring," and of patent application Serial No. 68,772, filed Nov. 14, 1960, now abandoned, for "A Method of Melting Iron Obtained by Direct Reduction of the Ore," in the name of the same applicant. Following this method, additions must be made to the slag to correct its properties.

The present invention is intended to dispense with this addition of non-metallic materials to the molten slag in contact with the consumable electrode and the steel bath. This operation presents difficulties of execution in practice. In order that it may be completely effective, it is necessary that it should be carried out between the electrode and the metallic bath. Furthermore, this addition should be made in small quantities at a time and repeated a large number of times, or even effected as a continuous process. A difficulty may arise due to the viscosity of the slag close to the cold walls of the ingot mould. It is also necessary that the addition should not be carried away by the excess of slag which flows out, before this addition has produced its effect.

Thus, according to the present invention, it is advantageous that these substances, metallic or non-metallic, should be incorporated in the electrode, even if on the other hand, as has been indicated in the above-mentioned application for "A Method of Continuous Conversion of Reduced Iron in the Hot State and Apparatus for This Method," the electrode of compressed iron is directly obtained by sintering from the hot iron powder at the very moment when it passes out of the reduction plant, it is no longer possible to make additions after this stage.

It has been found that it is possible to add these additions to the ferrous oxide in powder, in particular fluorspar $CaF_2$ in the finely-crushed state of the same granular size as the iron oxide and before the stage of reduction by hydrogen. By means of the continual agitation of the fluidized beds, the distribution becomes perfectly uniform, and it has been found that the moulding and sintering of the electrode can be carried out in a very satisfactory manner, with excellent effects on its subsequent fusion under slag.

This fusion by consumable electrode is improved by the fusibility and the conductivity conferred on the slag by the fluorspar. It is also possible to carry out additions of non-reducing oxide such as ilmenite or reducing oxides such as oxides of nickel, molybdic anhydride, calcium molybdate, etc., or again additions of metal such as nickel, iron alloys, etc.

By way of example, it is possible to incorporate 4% of fluorspar in the ore partially reduced to the state of ferrous oxide. This incorporation can be effected before or after the crushing of the ferrous oxide FeO. The fluorspar should be finely crushed (grains less than $100\mu$) if it is incorporated in the powdered monoxide ore ready to be reduced in a fluidized bed. This condition is not essential if it is mixed with the ferrous oxide after the latter has been subjected to a quenching operation, but it is preferable in this case also, so as to obtain a good uniformity of the mixture, to introduce the fluorspar grains of size not greater than $120\mu$.

The mixture of ferrous oxide and fluorspar is carried out in powder mixers of conventional types; it continues to be perfected during the course of reduction in the fluidized bed which causes an intense stirring action on the powdered products.

The presence of fluorine in the completely-reduced ore does not give rise to difficulty in the preparation of the consumable electrodes; thus, a powdered ore containing the reduced iron, 14% of gangue and 4% of fluorine, compressed at 700° C. under a pressure of 0.2 kgf. per sq. mm. for ten minutes, gives electrodes having a density of 4.7, a porosity of 15% and a hardness of 60 Rockwell A. These characteristics are amply sufficient for the electrodes to have mechanical strength and to resist thermal shocks during all the operations to which they are subjected during the course of use.

The physical properties given above in the precise case of electrodes containing 4% of fluorspar in addition to the gangue are not different from the physical properties of electrodes made under the same conditions but without fluorspar.

I claim:
1. A method for the production of electrode bars to be used in the electrosmelting of iron ore and steel, comprising the steps of reducing iron ore in a first stage to the monoxide state, crushing the reduced ore to powder form, adding slag-forming materials to this powdered reduced ore and then further reducing this ore in a second stage with a current of hot reducing gas, compressing and sintering the resultant metallic iron particles into electrode bars.

2. The method of claim 1 wherein the slag-forming material comprises fluorspar.

References Cited by the Examiner
UNITED STATES PATENTS

| | | | |
|---|---|---|---|
| 937,855 | 10/09 | Perkins | 75—13 |
| 1,593,157 | 7/26 | Berlin | 75—11 |
| 2,262,887 | 11/41 | Deppeler | 75—13 |
| 2,303,973 | 12/42 | Armstrong | 75—10 |
| 2,671,040 | 3/54 | Holmes | 75—10 X |
| 2,676,882 | 4/54 | Hatch | 75—201 |
| 2,686,822 | 8/54 | Evans et al. | 75—10 X |
| 2,805,930 | 9/57 | Edy | 75—11 |
| 2,894,831 | 7/59 | Old et al. | 75—26 |

DAVID L. RECK, *Primary Examiner.*

MARCUS U. LYONS, WINSTON A. DOUGLAS,
*Examiners.*